United States Patent [19]

Fisher

[11] 4,257,510

[45] Mar. 24, 1981

[54] NON-LINEAR SPRING RATE CLUTCH DAMPER

[75] Inventor: Walter Fisher, Mount Prospect, Ill.

[73] Assignee: Borg-Warner Corporation, Chicago, Ill.

[21] Appl. No.: 901,375

[22] Filed: May 1, 1978

[51] Int. Cl.³ ............................................. F16D 3/14
[52] U.S. Cl. .................. 192/106.1; 64/27 L
[58] Field of Search .......... 192/106.1, 106.2; 64/27 L

[56] References Cited

U.S. PATENT DOCUMENTS

| 1,598,795 | 9/1926 | Willene | 192/106.2 |
|---|---|---|---|
| 1,698,309 | 1/1929 | Lewis | 64/27 L |
| 1,977,368 | 10/1934 | Wood | 192/106.2 |
| 1,993,125 | 3/1935 | Tower et al. | 192/106.2 |
| 3,681,939 | 8/1972 | Timtner | 64/27 L |

FOREIGN PATENT DOCUMENTS 2225650  11/1974  France ................... 192/106.2

Primary Examiner—George H. Krizmanich
Attorney, Agent, or Firm—James A. Geppert

[57] ABSTRACT

A torsional vibration damper assembly for the transmission of power in a torsional coupling or automotive vehicle clutch wherein the coil springs normally disposed between the driving and driven plates of the assembly are replaced by one or more bowed leaf springs to provide a non-linear elastic system.

21 Claims, 10 Drawing Figures

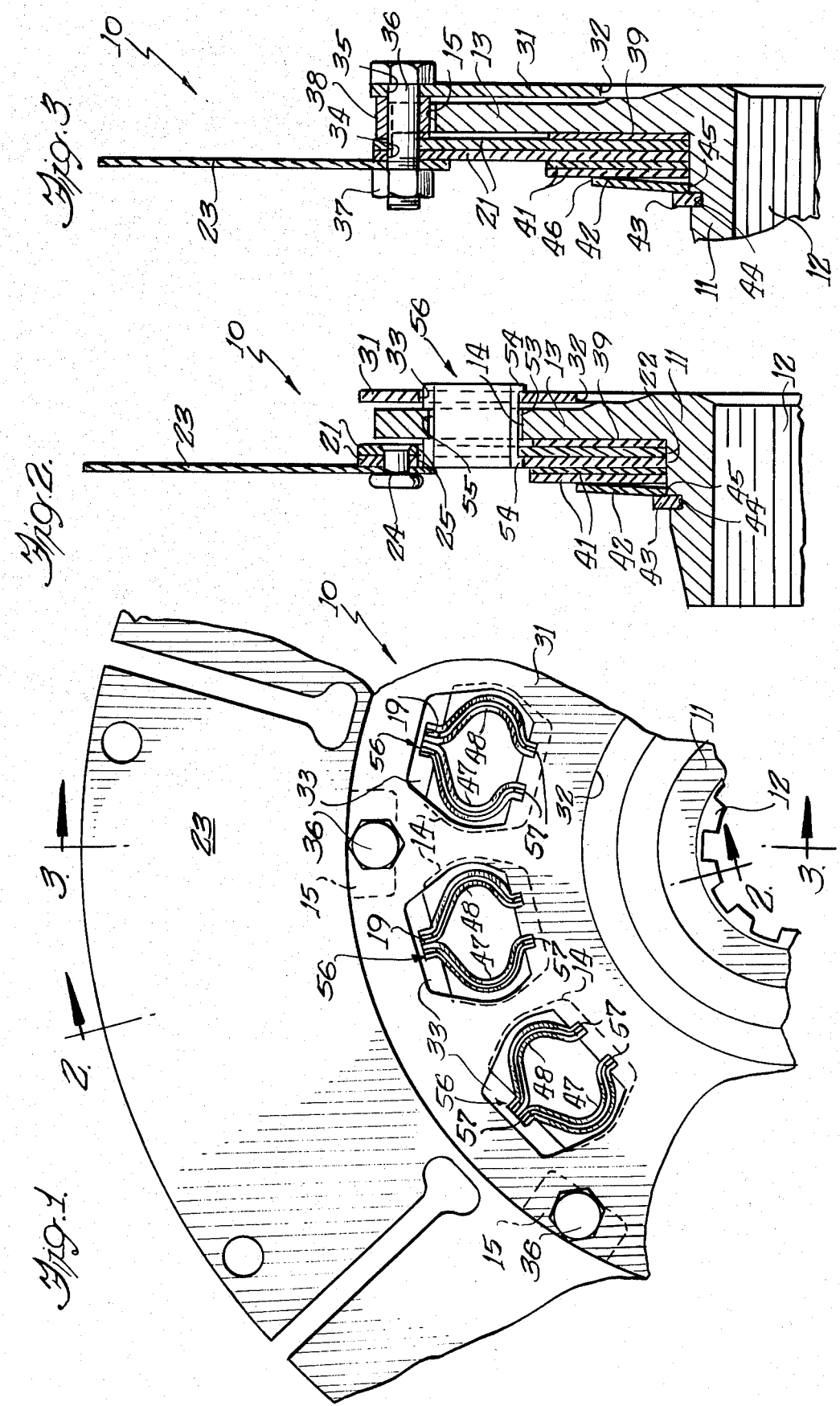

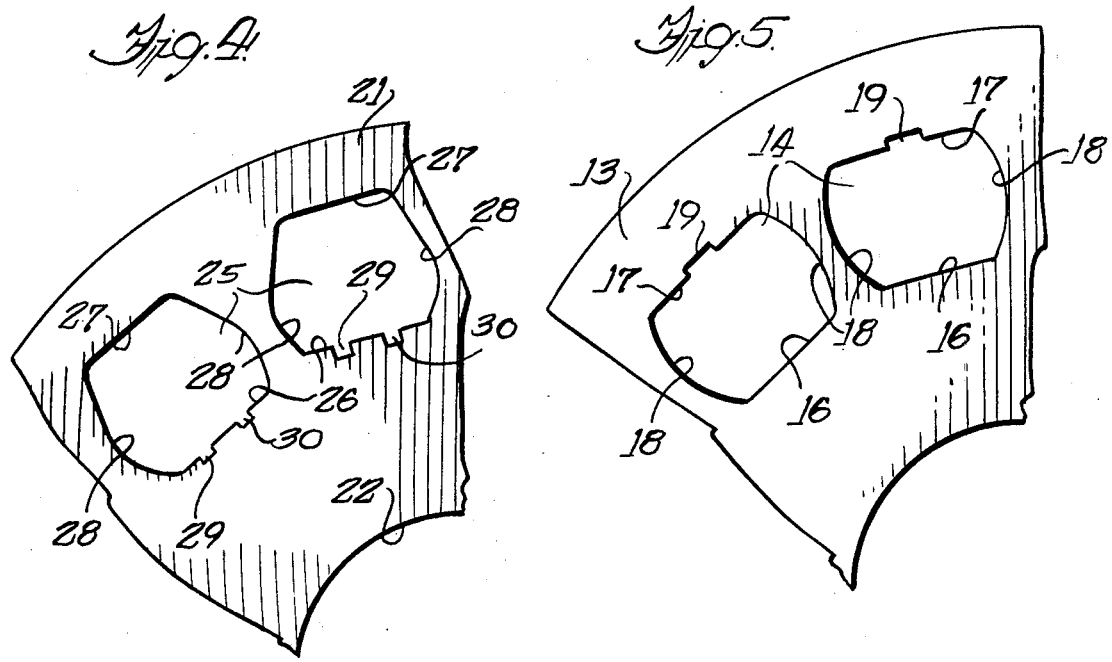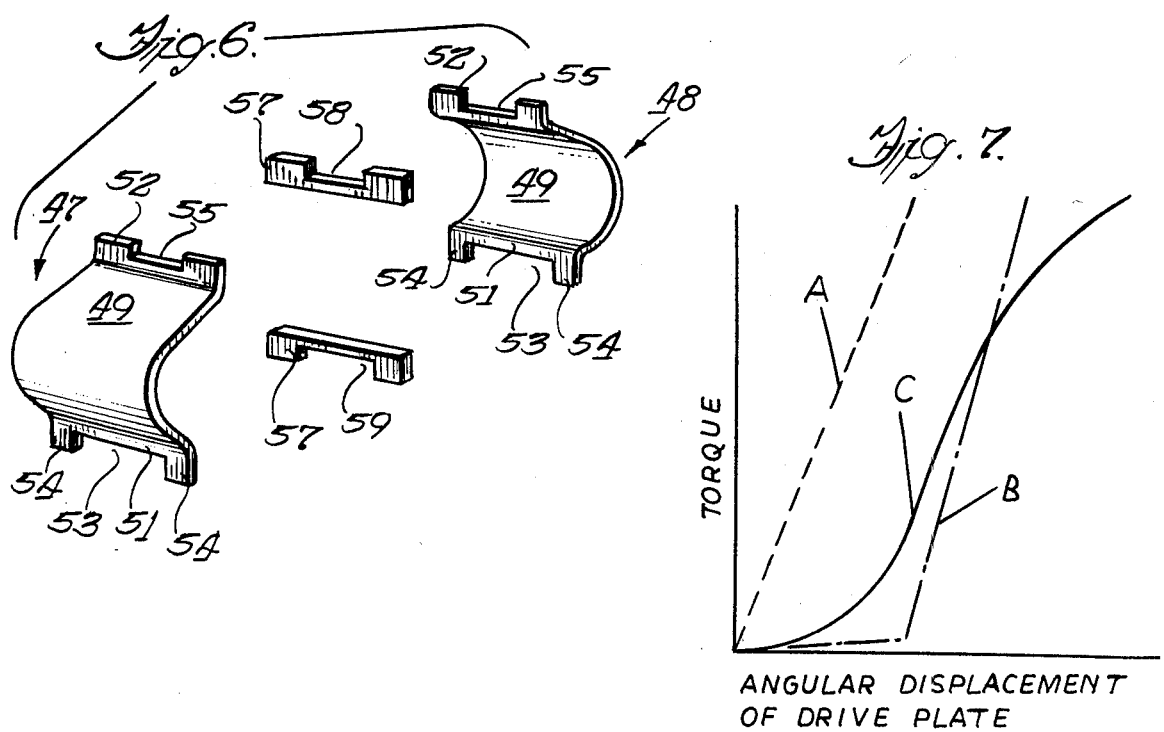

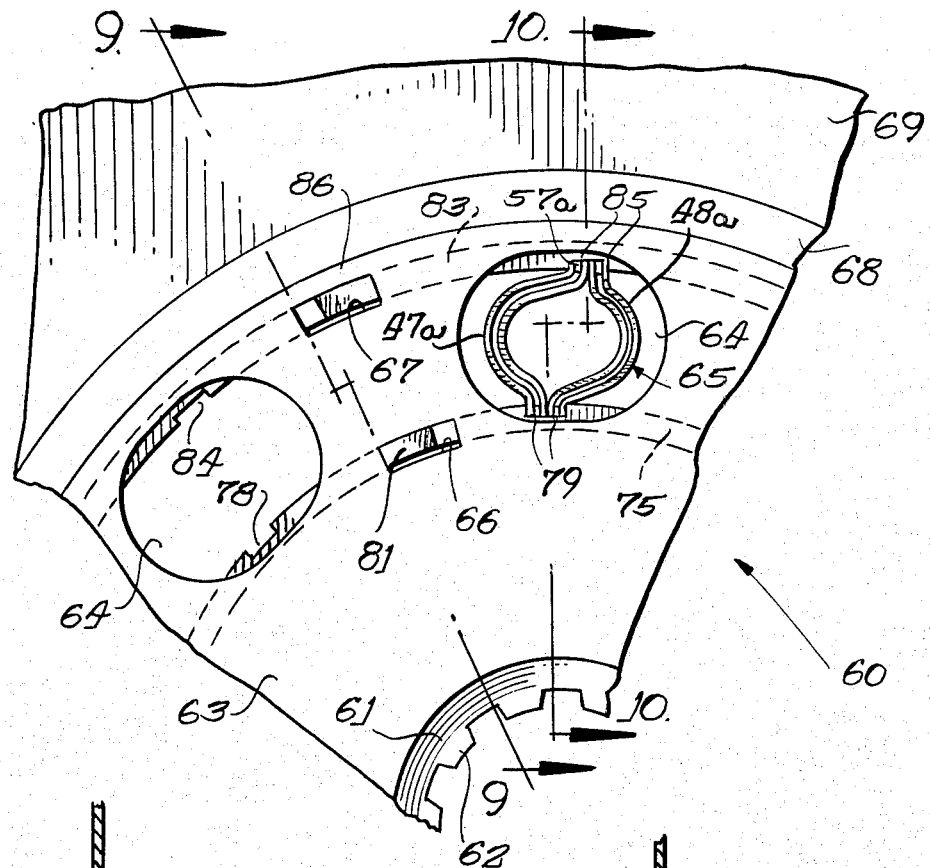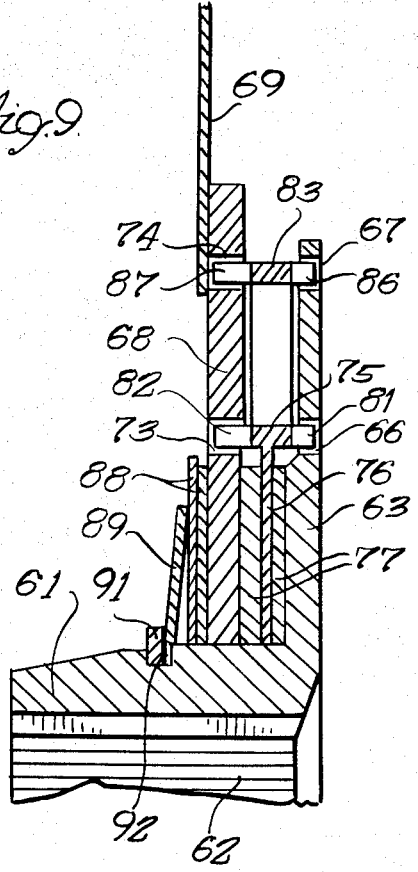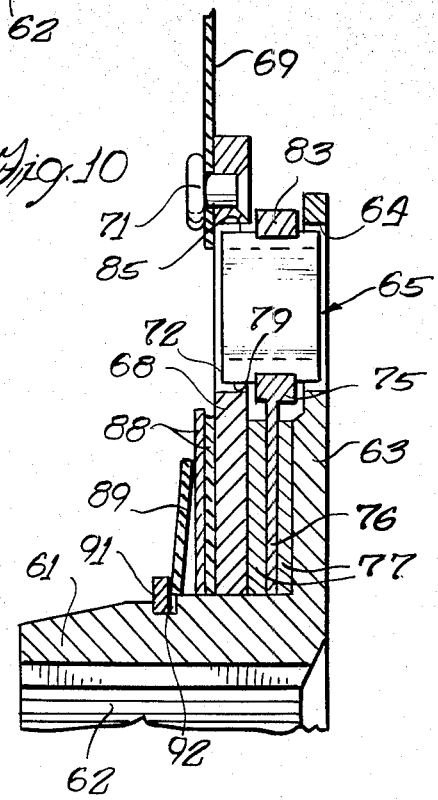

NON-LINEAR SPRING RATE CLUTCH DAMPER

BACKGROUND AND SUMMARY OF THE INVENTION

Vibration damper assemblies are used in a clutch disc for a motor vehicle power train where torsional vibration of the connected elements become troublesome in causing disturbing noises in the transmission and driveline. The vibration damper assembly is interposed in the clutch disc ahead of a manually operated transmission to neutralize the torsional vibrations emanating from the vehicle engine. A vibration damper may also be utilized for a lock-up clutch inserted in a torque converter for an automatic transmission where the vibrations occurring during direct drive between the torque input and the drive shaft would not be hydraulically dampened.

Conventional automotive clutch vibration dampers incorporate coil springs between the driving and driven plates of the damper. The loading characteristics of torque versus angular displacement for the coil spring dampers are linear and the spring rate can be increased in stages, which are also linear, by sequentially loading additional springs. Stress and geometrical design limitations are encountered with conventional coil spring designs in applications requiring large angular displacements and high torque capacity and with spring rate requirements that vary depending on operating conditions. The present invention acts to overcome these problems in providing a damper having a non-linear spring rate.

The present invention comprehends the provision of a vibration damper assembly for a clutch disc providing a non-linear spring rate. The non-linear rate is accomplished by substituting a bowed leaf spring pack for each coil spring set in the damper assembly. Loading tests on a bowed leaf spring pack under various magnitudes of radial compression provided non-linear load versus deflection characteristics. A wide range of design flexibility is available in shaping the load-deflection curve depnding on the spring pack design and the amount of radial compression.

The present invention also comprehends the provision of a non-linear spring rate vibration damper providing a load versus deflection curve having a decreasing spring rate at higher loading conditions, which is not obtainable with sequential linear spring systems. The decreasing spring rate at the higher loading conditions is desirable for vibration problems occurring under certain drive conditions.

The present invention further comprehends the provision of a non-linear spring rate vibration damper which is not subject to the wear and notching effects in a coil spring design damper. Coil spring designs are subjected to wear and notching effects at the coil ends due to the corner loading scissors action occurring at the spring retainer windows of the drive plates. This type of wear is completely eliminated with the bowed leaf spring type of design.

Another object of the present invention is the provision of a clutch vibration damper assembly wherein the damper has one or more leaf springs at each spring retainer window. Additional springs are stacked in a pack to obtain increased torque capacity. If additional damping is required, elastic material may be bonded between the leaf springs.

A further object of the present invention is the provision of a clutch vibration damper assembly where angular and parallel misalignment can be accommodated with the same bowed leaf spring type of design used for the power transmission coupling applications. Also, no lubrication is required for the leaf spring damper assembly.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a partial rear elevational view of a clutch disc embodying the vibration damper of the present invention.

FIG. 2 is a cross sectional view taken on the line 2—2 of FIG. 1.

FIG. 3 is a cross sectional view take on the line 3—3 of FIG. 1.

FIG. 4 is a partial elevational view of a driven plate showing the spring window configuration.

FIG. 5 is a partial elevational view of the clutch driving plate showing the window configuration.

FIG. 6 is an enlarged exploded perspective view of a pair of bowed leaf springs and spacers utilized in the present invention.

FIG. 7 is a graphic representation of a load versus deflection curve for the damper assembly of FIGS. 1–6.

FIG. 8 is a partial rear elevational view of an alternate embodiment of vibration damper.

FIG. 9 is a cross sectional view taken on the line 9—9 of FIG. 8.

FIG. 10 is a cross sectional view taken on the line 10—10 of FIG. 8.

DESCRIPTION OF THE PREFERRED EMBODIMENTS

Referring more particularly to the disclosure in the drawings wherein are shown illustrative embodiments of the present invention, FIGS. 1, 2 and 3 disclose a clutch plate assembly 10 incorporating the vibration damper assembly of the present invention. The clutch assembly includes a hub 11 having a central opening internally splined at 12 to receive the splined end of a driven shaft (not shown) leading to a transmission for an automotive vehicle. The hub is provided with a radially extending flange 13 having a plurality of irregularly shaped spring windows 14, which are circumferentially equal spaced, and a plurality of circumferentially spaced elongated arcuate slots 15 opening into the outer periphery of the plate and located radially outwardly of the spring windows 14.

As seen in FIG. 5, the spring windows 14 each have generally parallel inner and outer edges 16 and 17, respectively, with curved end edges 18, 18. The curvature of the edges 18, 18 is greater towards the outer periphery of the flange 13 for a purpose to be later described. The outer edge 17 of each window contains a notch 19 to receive the ends of the damper springs.

The driving plate for the clutch comprises one or more driving plates 21 having central openings 22 to receive the hub 11 and secured adjacent their outer peripheries onto an annular spring cushion plate 23 by suitable securing means such as rivets 24. The plate 23 carries the opposed friction facings (not shown) which are engaged by the flywheel and pressure plate found in a conventional vehicle clutch assembly. The plate or plates 21 each have a plurality of circumferentially spaced spring windows 25 generally aligned with the windows 14 of the hub flange 13. Each window has generally parallel inner and outer edges 26 and 27, respectively, and curved end edges 28; the edges 28 having greater curvature adjacent the inner edge 26. Also, the inner edge 26 has a pair of spaced notches 29, 30 for the damper springs.

On the opposite side of the hub flange 13 is an annular plate 31 having a central opening 32 and a plurality of circumferentially spaced spring windows 33 aligned with and identical in configuration with the windows 25 of the plates 21. Both plates 21 and plate 31 have circumferentially spaced openings 34 and 35, respectively, which are generally aligned with the arcuate slots 15 in the hub flange. Suitable securing means, such as shoulder rivets or the bolt 36 and nut 37 shown in FIG. 3 extend through the openings 34, 35 and slots 15 to secure the plates 21, 31 together; a spacer sleeve 38 being positioned on the bolt between the plates 21, 31 to provide suitable spacing therebetween.

Several friction plates 39, 41 are located on the opposite sides of the plates 21; with the friction plate 39 sandwiched between a plate 21 and the hub flange 13 and one or more plates 41 on the hub 11 beyond the plates. A conical spring 42 is received on the hub 11 and retained in operative position by a snap ring 43 receiving in an annular groove 44 in the hub. The inner edge 45 of the spring 42 abuts the snap ring 43 while the outer periphery 46 of the spring engages and yieldably urges the friction plates 41 against the driving plates 21.

As shown in FIG. 6, one or more pairs of oppositely bowed leaf springs 47, 48 are shown in a center stable design wherein each spring has an outwardly bowed central portion 49 terminating in inner and outer edges 51 and 52, respectively, that are radially offset. The inner edge 51 of each spring has a relatively wide central notch 58 separating a pair of ears 54, 54, while the outer edge 52 has a central notch 55 of a reduced width. As shown in FIG. 1, several pairs of the springs 47, 48 with spacers 57 therebetween may be used forming a spring pack 56 with the width of the notches 19, 29 and 30 in the flange and plates depending on the number of leaf springs and spacers utilized in the pack.

Each spacer 57 between the outer edges 52 of the leaf springs has a notch 58 corresponding to the notch 55, while each inner spacer 57 has a relatively wide notch 59 formed therein.

As seen in FIG. 1, the leaf springs are positioned with their outer edges 52 and spacers 57 received in the notches 19 in the hub flange 13; the edges 52 of the oppositely bowed springs 47 and 48 in each pack and spacers abutting and retained together by a notch 19. The notches 55 of the springs and notches 58 of the spacers 57 receive the base of the notch 19 to prevent lateral displacement of the leaf springs during use. With respect to the inner edges 51 of the springs, the edges of one bowed set of springs 47 and spacers 57 are received in aligned inner notches 29 of the plates 21 and 31, and the edges of the oppositely bowed set of spring 48 and spacers 57 are received in the spaced notches 30 in the plates. The central notches 53 of the springs and notches 59 of the spacers receive the base of the notches 29, 30 of the plate 31 and at least one plate 21, with the ears 54, 54 positioned outside of the plate 31 and outside of at least the inner of the plates 21; the outer plate 21 having spring windows to receive the ear 54 to prevent lateral displacement of the springs.

In operation, when the friction surfaces of the spring cushion plate 23 are engaged by the flywheel and clutch pressure plate (not shown), the plates 21 secured thereto and the plate 31 act to move as a unit relative to the hub flange 13 as yieldably allowed by the spring pack 56. The arcuate slots 15 receiving the bolts 36 and spacer sleeves 38 limit the relative motion between the plates 21, 31 and the hub flange 13 and hub 11 with the spring pack 56 acting in a non-linear manner. As seen in FIG. 7, the straight line curve A represents a conventional linear loading curve obtained by the use of coil springs in a conventional vibration damper. Curve B represents a conventional two-stage spring rate loading curve obtained by sequentially loading two sets of coil springs such as in the damper shown by U.S. Pat. No. 2,028,951. In curve B, the lower rate portion reduces vibration at low torques, such as at idle, and the high rate extends the load capacity to cover the driving range. The curve C indicates a non-linear curved shape obtained with the center stable bowed leaf spring pack design disclosed above. The decreasing spring rate at higher loading conditions is desirable where vibration problems occur under certain drive conditions; this type of decreasing spring rate being unobtainable with sequential linear spring systems.

FIGS. 8 through 10 disclose a second embodiment of vibration damper wherein a clutch plate assembly 60 incorporates the vibration damper and includes a clutch hub 61 having internal splines 62 and a radially extending flange 63 formed at one end of the hub. The flange includes a plurality of circumferentially spaced irregularly shaped openings 64 to receive leaf spring packs 65 having a one-way offset spring orientation, a plurality of inner slots 66 on a circle of the inner radius of the openings 64 and a plurality of outer slots 67 on a circle of the outer radius of the openings; the slots 66, 67 being located between the openings 64 and slightly radially offset from each other.

The driving plate for the clutch plate assembly 60 comprises an annular plate 68 journalled on the hub 61 and having an annular spring clutch plate 69 secured to the outer periphery thereof by suitable securing means, such as rivets 71; the plate 69 carrying the opposed friction facings (not shown). The plate 68 has a plurality of openings 72 and inner and outer slots 73 and 74, respectively, corresponding to and identically positioned with the openings 64 and slots 66 and 67 in the hub flange for axial alignment therewith.

Positioned between the hub flange 63 and the plate 68 are an inner loading ring 75 and an outer loading ring 83; the inner ring 75 having a radially inwardly extending flange 76 journalled on the hub 61 and positioned between suitable friction washers 77, 77 engaging the surfaces of the hub flange 63 and plate 68. The inner ring 75 has a plurality of circumferentially spaced notches 78 on the outer periphery thereof, each notch receiving the inner ends 79 of a spring pack 65, and a plurality of ring loading lugs 81 and 82 extending from opposite sides thereof into the slots 66 and 73, respectively.

The outer loading ring 83 is floatingly positioned between the hub flange 63 and the driving plate 68 and is provided with circumferentially spaced notches 84 on the inner periphery, each notch receiving the outer ends 85 of the spring pack 65, and a plurality of ring loading lugs 86 and 87 extending from opposite sides thereof into the slots 67 and 74, respectively. The width of each spring pack 65 is greater than the width of the rings 75 and 83 and the opposite edges of each spring pack projects into the aligned openings 64 and 72. Also, the thickness of each loading lug is less than the length of its respective slot, and this differential provides the angular deflection allowed between the plate 69 and the hub flange 63.

Each spring pack 65, as seen in FIG. 8, consists of a plurality of oppositely bowed leaf springs 47a and 48a separated by spacers 57a and is deformed in an unsymmetrical manner to provide a one-way offset spring orientation for a minimum load on the compression rings 75 and 83; the offset orientation resulting in increased torque capacity. One or more friction washers 88 are journalled on the hub 61 and positioned to contact the surface of the plate 68 opposite to the rings, and a diaphragm spring 89 is journalled on the hub and oriented to urge the washers 88 against the plate 68. A retaining or snap ring 91 located in an annular groove 92 formed in the hub provides a stationary abutment for the inner periphery of the spring 89; the spring acting on the washers 88 to provide a controlled friction damping between the driving plate 68 and the hub flange 61.

As seen in FIG. 8, the spring pack configuration acts to normally urge the outer loading ring 83 in a clockwise rotation and to urge the inner loading ring 75 in a counterclockwise rotation. Thus, the lugs 81 and 82 of the inner ring 75 abut the left-hand ends of the inner slots 66 and 73, and the lugs 86 and 87 of the outer ring 83 abut the right-hand ends of the slots 67 and 74; the rings keeping the bowed leaf spring pack 65 under initial compression. Loading of the driving plate 68 or the hub 61 in either rotational direction causes contact and corresponding displacement at the compression ring loading lugs 81, 82 or 86, 87. Relative displacement of either compression ring compresses the spring packs 65 and torque increases in a non-linear manner.

Viewed from the rear side of the clutch plate assembly as seen in FIG. 8, displacement clockwise of the hub 61 and flange 63 loads and displaces the inner ring 75 through the lugs 81; while counterclockwise displacement of the hub and flange loads and displaces the outer ring 83 through the lugs 86. Likewise, when the driving plate 68 is deflected clockwise, it loads and displaces the inner ring 75 through the lugs 82; while displacement counterclockwise loads and displaces the outer ring 83 through the lugs 87. The extent of displacement is limited by the amount of movement allowed a lug within its respective slot in the flange or driving plate. The torque during this limited displacement will follow the non-linear path shown as curve C in FIG. 7.

The spring packs 56 and 65 are preferably formed of conventional spring steel leaf springs with metal spacers 57 or 57a required between the stacked springs for flexibility. The springs and spacers could be loosely mounted within the notches; each spacer could be bonded, as by welding, to each spring; or the entire spring pack or a portion thereof could be fastened together as a unit with rivets extending through suitable openings in the ends of the leaf springs and spacers. Although preferably of metal, this invention contemplates a spring pack formed of plastic leaf springs and spacers or a spring pack which is molded in one piece from a suitable rubber or plastic material; the unit being molded with unitary end portions and connecting leaf springs spaced apart for flexibility.

I claim:

1. A vibration damper assembly for transmitting torque between two elements comprising a driving member and a driven member, said driven member including a hub provided with an integral radial flange having a plurality of circumferentially spaced openings therein, said driving member including at least one plate journalled on said hub and having a plurality of circumferentially spaced openings therein generally axially aligned with the openings in the hub flange, and a spring pack comprising a plurality of closely stacked leaf springs received in each set of aligned openings, said spring pack being divided into two sets of leaf springs oppositely bowed in the direction of rotation and having the opposite end extremities thereof operatively connected to the hub flange and plate such that the opposite end extremities move in opposite circumferential directions when torque is applied to either of the members.

2. A vibration damper assembly as set forth in claim 1, in which spacers are located between the ends of the leaf springs.

3. A vibration damper assembly as set forth in claim 1, in which one or more friction washers are journalled on said hub to engage said driving plate, and a diaphragm spring is mounted on said hub to bias said driving plate and friction washers toward said hub flange.

4. A vibration damper assembly for transmitting torque between two elements comprising a driving member and a driven member, said driven member including a hub provided with a radial flange having a plurality of circumferentially spaced openings therein, and said driving member including a driving plate and an annular plate located on opposite sides of the hub flange and suitably secured together, a plurality of generally axially aligned circumferentially spaced openings in said plates generally axially aligned with the openings in the hub flange, at least one notch in the radially inner edge of each plate opening, a notch in the radially outer edge of each flange opening, a spring pack comprising a plurality of outwardly bowed leaf springs received in each set of openings, said spring pack being divided into sets of oppositely bowed leaf springs operatively connected to the driving and driven members to provide a non-linear spring rate when torque is applied to either of the members, the notches receiving the end extremities of the bowed leaf springs in each spring pack.

5. A vibration damper assembly as set forth in claim 4, in which the inner edge of each plate opening includes a pair of spaced notches, the spring pack comprising two groups of oppositely bowed leaf springs, the ends of one group being received in one notch and the ends of the second group received in the other.

6. A vibration damper assembly as set forth in claim 4, in which the inner edges of the hub flange openings are located on a circle radially inwardly of a circle containing the inner edges of the plate openings, and the outer edges of the plate openings are located in a circle radially outwardly of a circle containing the outer edges of the flange openings.

7. A vibration damper assembly as set forth in claim 4, in which each leaf spring has a relatively wide notch in the inner end so as to encompass said plates and flange and a relatively narrow notch in the outer end so as to encompass the hub flange alone.

8. A vibration damper assembly as set forth in claim 7, in which the notched portions of the leaf springs are received in the notches formed in the plates and hub flange.

9. A vibration damper assembly as set forth in claim 1, in which said driving member is an annular plate journalled on said hub, and a pair of annular concentric compression loading rings are positioned between said driving plate and said hub flange and operatively connected to both said spring packs, said hub flange and said driving plate.

10. A vibration damper assembly as set forth in claim 9, in which said loading rings comprise an inner ring having a radially inwardly extending flange journalled on said hub, and spacer washers between said last-mentioned flange, said hub flange and said driving plate, and an outer ring floatingly mounted between said hub flange and driving plate.

11. A vibration damper assembly as set forth in claim 10, in which said rings have circumferentially spaced notches receiving the inner and outer ends of the bowed leaf springs in each spring pack.

12. A vibration damper assembly as set forth in claim 11, in which said hub flange and driving plate have a plurality of circumferentially spaced slots on circles generally axially aligned with said loading rings, and a plurality of laterally projecting loading lugs on each loading ring and received into the corresponding slots in the hub flange and driving plate.

13. A vibration damper assembly as set forth in claim 12, in which each slot is greater in length than the width of the loading lug received therein to permit relative rotation of either ring relative to either the hub flange or the driving plate.

14. A vibration damper assembly as set forth in claim 13, in which the slots in either the hub flange or the driving plate on the inner circle are radially offset from the slots on the outer circle.

15. A vibration damper assembly as set forth in claim 14, in which said spring packs place said loading rings under an initial load with the inner ring biased in one direction of rotation and the outer ring biased in the opposite direction of rotation.

16. A vibration damper assembly as set forth in claim 15, in which said inner and outer slots are radially offset opposite to the biased directions of rotation of the loading ring, the slots cooperating with the loading lugs limiting the rotation of the rings.

17. A vibration damper assembly as set forth in claim 11, in which the notches in the inner and outer loading rings are radially offset so that said spring pack is in a one-way offset orientation.

18. A vibration damper assembly as set forth in claim 17, in which the circumferentially spaced openings in the hub flange and driving plate are dimensioned so as to receive the projecting edges of the leaf springs in the spring pack without being in operative engagement therewith.

19. A vibration damper assembly as set forth in claim 18, including friction washers journalled on said hub engaging the surface of the driving plate opposite to said hub flange, and a diaphragm spring mounted on the hub to engage the friction washers and urge them into frictional contact with the driving plate.

20. A vibration damper assembly as set forth in claim 19, in which said diaphragm spring biases the driving plate toward said hub flange.

21. A vibration damper assembly as set forth in claim 9, including a spacer located between the ends of each leaf spring in the spring pack.

* * * * *